May 22, 1923.
W. W. DEAN
MOTOR GOVERNOR
Filed June 20, 1919
1,456,300
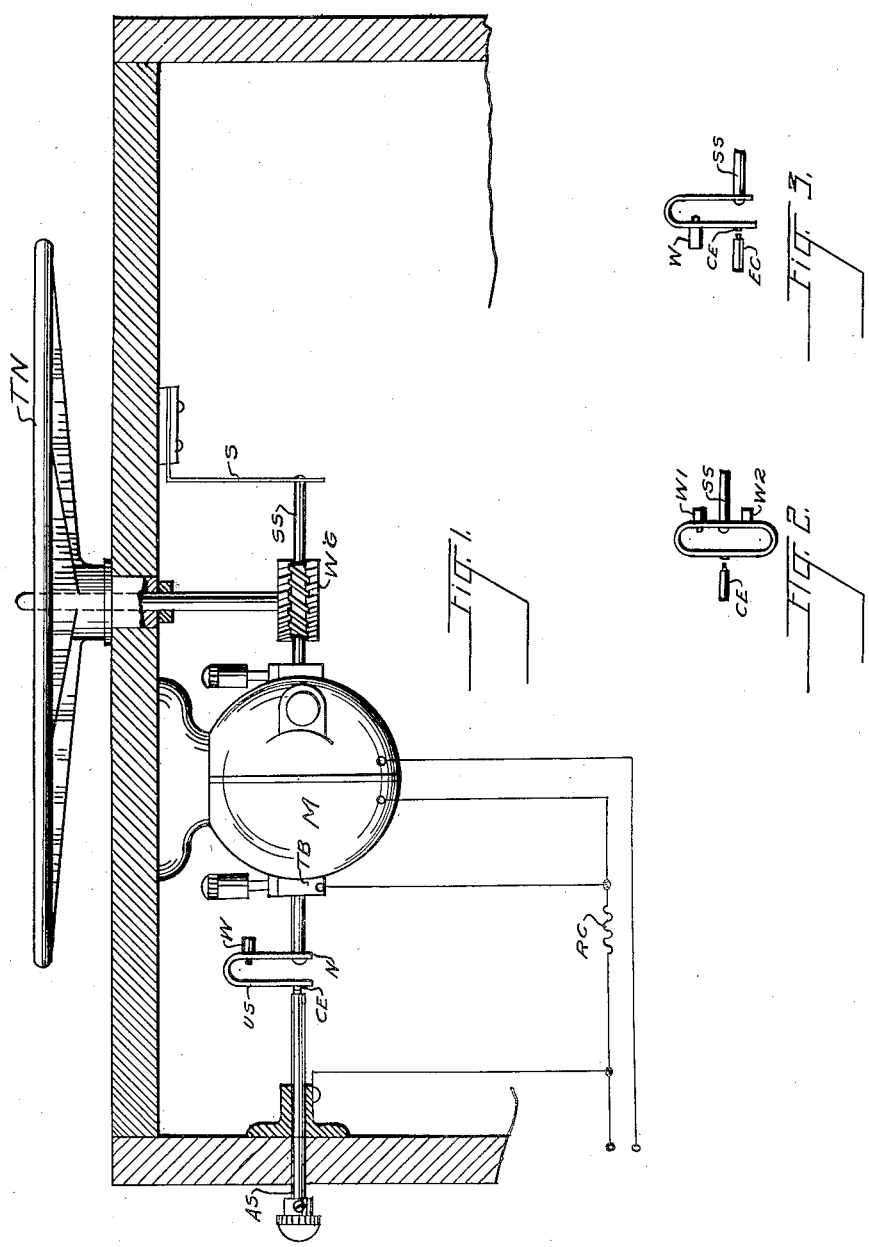
Inventor
W. W. Dean
By Frank M. Slough
Atty.

Patented May 22, 1923.

1,456,300

UNITED STATES PATENT OFFICE.

WILLIAM W. DEAN, OF WILMETTE, ILLINOIS, ASSIGNOR TO EFFICIENCY ELECTRIC CORPORATION, OF NEW YORK, N. Y., A CORPORATION OF NEW YORK.

MOTOR GOVERNOR.

Application filed June 20, 1919. Serial No. 305,527.

*To all whom it may concern:*

Be it known that I, WILLIAM W. DEAN, a citizen of the United States, residing at Wilmette, in the county of Cook and State of Illinois, have invented certain new and useful Improvements in Motor Governors; and I do hereby declare the following to be a full, clear, concise, and exact description of the invention, such as will enable those skilled in the art to which it appertains to make and use the same.

My invention relates to motor governing devices, and more particularly to such governing devices as may be used in connection with motors required to be operated at a constant speed as, for instance, phonograph motors and the like, although I may employ the device of my invention wherever such a device finds a use.

It has been previously proposed to control the speed of a motor, such as electric motors, for driving the turn-table of a phonograph, by centrifugally operated electric contacts, the same controlling electric circuits adapted under the control of these centrifugally operated contacts to retard the speed of the motor, so that the motor cannot exceed a given predetermined speed which is substantially that speed required to actuate the centrifugally operated contacts.

The object of the present invention is to provide an improved motor governor, of the weighted type, which is efficient and uniform in operation, which is capable of being maintained in a given condition of adjustment and which is inexpensive to manufacture and which may be manufactured in large quantities with the uniformity of resultant product.

The object of the present invention is to provide a reed spring governor wherein the electrical contact carried by the reed is shifted in a line coincident with the axis of rotation of the motor shaft, and which reed spring may be secured directly to the motor shaft without the necessity of providing a separate mount for the same.

Other objects of my invention and the invention itself will be more apparent to those skilled in the art to which it appertains by reference to the drawings accompanying this specification which show certain embodiments of my invention.

Referring to the drawings of Fig. 1, I show an embodiment of my invention applied to the motor shaft of an electric motor used to drive the turn-table of the phonograph. Fig. 1, also shows electric circuits which may be employed in connection with the governor of my invention.

Fig. 2 shows another form of the governor of my invention in which the reed spring forms a closed loop, each half of the loop having like centrifugal constants.

Fig. 3, shows another form of the embodiment of my invention illustrated in Fig. 1, but in which the weight carried is placed at a different point on the reed spring, to cause the electrical contact carried to travel in an opposite direction along the axial line than in the form illustrated in Fig. 1.

Referring now to Fig. 1, at TN, I show a phonograph turn-table which is required to be driven by an electric motor M at a constant speed. The worm gear WG is interposed between the turn-table and the motor shaft SS so that the said shaft communicates motion to the said turn-table. A thrust spring S and thrust bearing TB is provided for the motor shaft to prevent longitudinal displacement of the said shaft when the motor is operated. Mounted on the end of the shaft is a U-shaped loop spring US one end of which N is axially secured to the motor shaft, and at the other end in line with the shaft axis is mounted the centrifugally operated contact CE.

Co-operating with the centrifugal contact CE is a stationary contact EC mounted on an adjusting screw AS. These contacts which when the motor is at rest are in engagement, are serially included in the circuit with the source of current of the motor. Shunting the serially included contacts, is a resistace coil RC provided for the purpose of preventing an excessive sparking at the contacts when the governor is operated.

Mounted on the fixed arm of the U-shaped member US is the weight W, the centrifugal effect of which weight being to cause the carried contact CE to travel towards the motor along the axis of rotation of the shaft, as the motor speed increases beyond a predetermined speed.

At a predetermined speed on account of this effect, the contacts CE—EC are broken and the motor speed is immediately retarded again closing these contacts. This action is frequent and continuous and reliable enough to maintain a constant predetermined motor speed varying according to the adjustment of the fixed contact under the control of the adjusting screw AS.

Referring to Fig. 2, I show a modification of the embodiment illustrated in Fig. 1, which may be employed to dampen possible harmonic vibrations of the reed. In Fig. 2, the reed is shown as a closed loop comprising two carried weights, $W^1$ and $W^2$, one for each side of the loop.

Referring to Fig. 3, I show the embodiment of my invention illustrated in Fig. 1, but having the carried weight W mounted upon the free arm of the reed spring. In this form, the contacts CE—EC are closed instead of opened upon a predetermined motor speed.

In some circuit arrangements known in this art such a closing circuit is considered preferable.

Having described my invention as embodied in several specified forms, I wish to have it understood that I do not limit my invention to these exact structures but am aware that numerous and extensive departures may be made from the embodiment of my invention herein illustrated and described without departing from the spirit of my invention.

What I claim as my invention is defined in the following claim:—

In a motor governing system, the combination with an electric motor, a reed spring governor therefor, electric circuit controlling contacts operated by the said governor to control the speed of the motor, the said governor comprising a U-shaped reed, one arm of the said reed being secured to the said shaft, the other arm of the said reed being free and carrying an electric controlling contact, the said controlling contact being mounted in line with the axis of rotation of the said shaft, and a centrifugal weight mounted on the secured arm of the said spring.

In witness whereof, I hereunto subscribe my name this 17 day of June, A. D. 1919.

WILLIAM W. DEAN.